No. 629,897. Patented Aug. 1, 1899.
G. FERRARIS & R. ARNO.
ARRANGEMENT FOR STARTING ALTERNATING CURRENT MOTORS.
(Application filed July 6, 1895.)
(No Model.)
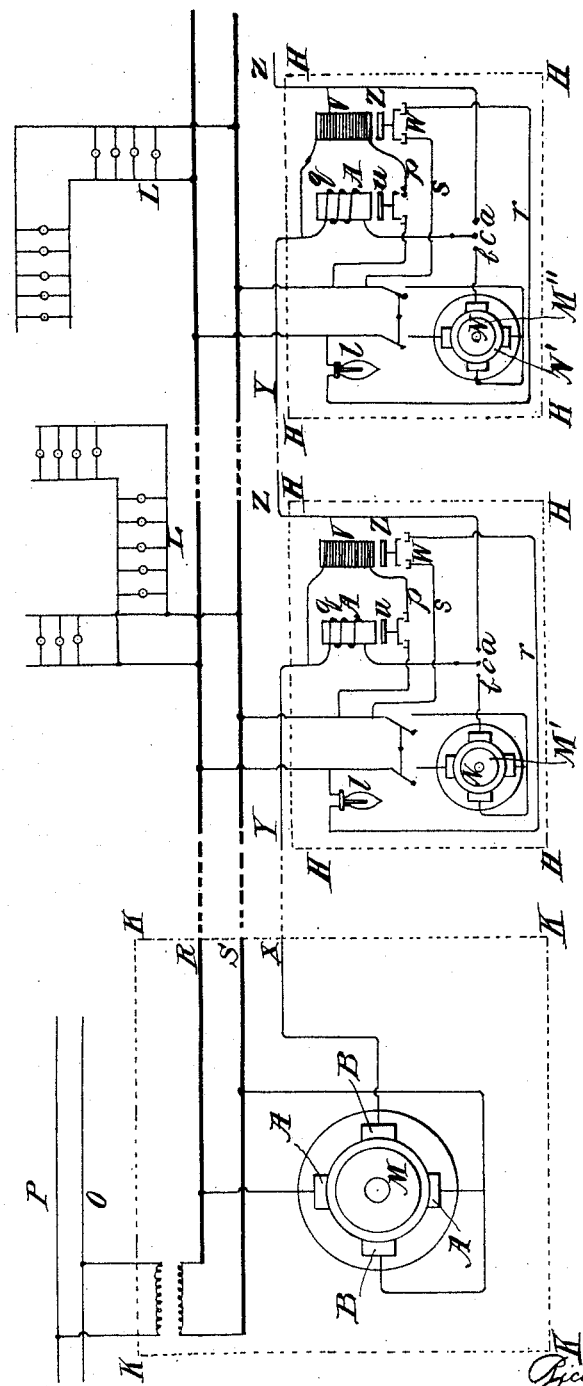

UNITED STATES PATENT OFFICE.

GALILEO FERRARIS AND RICCARDO ARNO, OF TURIN, ITALY.

ARRANGEMENT FOR STARTING ALTERNATING-CURRENT MOTORS.

SPECIFICATION forming part of Letters Patent No. 629,897, dated August 1, 1899.

Application filed July 6, 1895. Serial No. 555,106. (No model.)

*To all whom it may concern:*

Be it known that we, GALILEO FERRARIS, civil engineer and professor of electric technology, and RICCARDO ARNO, electrical engineer, residing at Turin, Italy, have invented certain new and useful Improvements in Methods of and Apparatus for Starting and Operating Alternating-Current Electric Motors; and we do hereby declare the following to be a full, clear, and exact description of the invention, such as will enable others skilled in the art to which it appertains to make and use the same, reference being had to the accompanying drawing, and to letters of reference marked thereon, which forms a part of this specification.

Our invention relates to improvements in systems of electrical distribution, and particularly relates to systems in which single-phase currents are supplied to one or more circuits containing translating devices of the single-phase type, such as lamps, and at certain points of the system out-of-phase currents are produced to be used in starting alternating-current motors which are run at normal speed as single-phase motors.

Referring to the drawing, the figure is a view of the system in diagram, showing the motors connected to the single-phase mains, which also supply groups of lamps or other translating devices, here shown as arranged in multiple, together with the circuit carrying the out-of-phase currents or electromotive forces, with the devices and switches by which the various connections are made and the desired indications given.

Referring to the drawing, R S are the single-phase mains, supplied from a source of single-phase currents.

L L L are groups of incandescent lamps or other devices connected in parallel to the mains R S, the lamps being in parallel with each other.

X Y Z represent the conductor, which receives energy from a phase-displacing transformer M.

M' M² M³ are motors which are connected while in operation with the line wires or conductors R S. These motors at normal speed are operated as single-phase motors, being disconnected from the circuit X Y Z, carrying the out-of-phase current or electromotive force, when normal speed is reached.

Furthermore, a characteristic feature of this invention is an arrangement which permits in a simple and practical manner the starting of any number of electromotors without a generator being required for producing a current or supplementary conductor X Y Z being required for transmitting a current of greater intensity than that which is necessary for the starting of one single motor. This result is obtained as follows:

In each receiving-station a switch C' is arranged which serves to put the portion Y of the supplementary conductor X Y Z, which starts from the phase-displacing transformer M, which produces the current changed in its phase, into communication either with the motor intended to be started or with the portion Z of the supplementary conductor which goes to the successive receiving-stations in such a way that a subscriber is not enabled to start his own motor without interrupting the communication of the successive motors with the generator M of the phase-displaced current. By this arrangement a subscriber can always ascertain whether at any moment he can make use of the supplementary conductor X Y Z. In our system one phase-displacing transformer alone can serve for starting a number of monophased asynchronous motors, even when one of these is placed at a great distance, and the phase-displacing transformer produces and its secondary circuit transmits no larger current than that which is necessary to start the largest of the motors.

The two-way switch C, placed at each receiving-station, serves to connect the part Y of the wire X Y Z coming from the phase-displacing transformer either with the motor it is desired to start or with the branch Z which leads to the following receiving-stations, so that a receiving-station cannot start its own motor without breaking the connection between the following motors and the phase-displacing transformer. It is thus a feature of our system that only one motor at a time can use the third wire, and in order that no attempt to start two motors at once will be made it is necessary to provide some arrangement which will show when the third wire is in use at any point whatever. It will be noticed that when the third wire is not in use it is at a different potential from that of the mains R S, but carries no current. When it is in use at a point beyond the station at which it is desired to start the motor, a difference of potential will exist and a current will also be passing. When it is in use at a point between the station in question and the phase-changer M, the third wire will be entirely dead, as is obvious from the connection of the switch C'. There will be neither difference of potential nor current when the wire X Y Z is used for starting one of the preceding motors; but when it is used for the starting of a subsequent motor there will be difference of potential and current. It will therefore be sufficient that the receiving-station have a current-indicator inserted upon the wire Y and a potential-indicator between the wires Y and S. It can use the third wire when the current-indicator reads zero and the potential-indicator gives any reading whatever other than zero, but not when both potential-indicator and current-indicator give readings nor when they are both at zero. The desired result can be attained in an easier and more practical manner by means of an arrangement by which when a current passes through the wire X Y Z the effect of that current will be to break the circuit of the potential-indicator. In such case every time the wire X Y Z is occupied the potential-indicator will mark zero, while when the wire X Y Z is free it will indicate a difference of potential, so that it will be necessary only to observe these indications at the receiving-station. For this purpose it will be sufficient to replace the current-indicator either by an electromagnet A, as shown, as an instance, in the figure, or by some other apparatus which when put in motion by the current of the wire Y operates a circuit-breaker $v$, inserted in the circuit $p\,q$ of the potential-indicator. A good substitute for the potential-indicator is an apparatus placed in shunt between the wires S and Y, which directly or indirectly indicate by a visible or some other noticeable sign the existence of the tension. This apparatus can, for instance, consist of an electromagnet V. In such case the visible or otherwise noticeable sign can be produced by the motions of its armature. Among the visible signs that can be produced there is one that is very suitable, and consists in the lighting or extinguishing of an electric lamp. One manner of producing this effect is shown. The electric lamp $l$ is inserted between the main conducting-wires R S by means of the wires $r$ and $s$. A circuit-breaker $w$, operated by the armature $z$ of the electromagnet V, is situated between the wires. As long as the tension exists the armature $z$ will be raised and the lamp $l$ extinguished. As soon as the tension ceases to exist the armature drops and the lamp will be lighted.

The system works as follows: When the wire X Y Z is not used by any of the receiving-stations, no current passes the electromagnets A, which serve as current-indicator, and the circuit $p\,q$ of the volt-indicating electromagnet V is closed. This electromagnet will attract its armature $z$ and break in W the current of the lamp, which will thereby become extinguished. If, on the contrary, the wire X Y Z is used for starting the motor M'', the lamps will be lighted in all preceding receiving-stations, for with the motor M', for instance, located between the phase-displacing transformer and the motor M'' a current will pass through the electromagnet A and will attract its armature, and the circuit-breaker $v$ will break the circuit $p\,q$ of the volt-indicating electromognet V, and the circuit-breaker $w$ remains closed and the lamps lighted. As to the motors which follow the motor M'' no difference of potential will exist between the wires Q and Y, and thus the volt-indicating electromagnet V will not attract its armature $z$. Therefore the circuit-breaker $w$ will remain closed and the lamp $l$ lighted. The motors which are beyond the motor M'' will receive no current from the out-of-phase line X Y Z, since there is no connection between the source of out-of-phase currents and the line X Y Z beyond M''. Hence the volt-indicating electromagnet V at each station beyond M'' will not attract its armature $z$, and the circuit-breaker $w$ will remain closed and each of the lamps at these stations will remain lighted. From this it will be evident that when the lamps are lighted at any of the stations it will indicate that some (one or more) of the preceding stations are at that time utilizing the out-of-phase energy to start the motors.

It is easy to think of other arrangements by which the motions of the armature $w$ of the volt-indicating electromagnet V instead of serving to close or break the circuit of a lamp $l$ serve, on the contrary, to operate a mechanical device which will serve the same purpose.

Though we have illustrated our device in connection with motors, it is evident that it is equally applicable to any translating device whatever—as, for instance, a rotary transformer—and though we have shown the secondary member of the transformer M rotating and of the induction type it is evident that any mere reversal or substitution of any other form of secondary will nevertheless give a system which is within the scope of our invention, though the forms which we have shown are the preferred ones.

We claim—

1. In a system of electrical transmission and distribution, the combination of a source of single-phase alternating currents, a line-circuit, or circuits, extending therefrom, means located at a point, or points, by which out-of-phase electromotive forces, or currents, are produced from the single-phase current, electrodynamic receivers connected to the single-phase mains and capable of being connected with the conductor leading from the producer of out-of-phase electromotive force or currents, and switching devices one for each receiver normally included in and forming part of the conductor leading from the producer of out-of-phase electromotive force and so arranged that on manipulating any one of the said switching devices the circuit of the said out-of-phase conductor will be broken, and the corresponding receiver will be connected to the producer of out-of-phase electromotive force.

2. In a system of electrical transmission and distribution, the combination of a source of single-phase alternating currents, a circuit or circuits extending therefrom, means located at a point or points by which out-of-phase electromotive forces, or currents, are produced from the single-phase current, electrodynamic receivers connected to said single-phase mains, a circuit connected to the producer of out-of-phase electromotive forces or currents, extending between the various receivers, and means whereby the various receivers can only be dissimultaneously connected with the source of out-of-phase electromotive force.

3. In a system of electrical transmission and distribution, the combination of a source of single-phase alternating currents, a circuit or circuits extending therefrom, means located at a point or points by which out-of-phase electromotive forces, or currents, are produced from the single-phase current, electrodynamic receivers connected to said single-phase mains, a circuit connected to the producer of out-of-phase electromotive forces or currents extending between the various receivers, a switch located near each of the receivers in the said out-of-phase circuit by which its receiver can be connected to said source of out-of-phase electromotive force only when the other receivers at the same time are disconnected from the source of out-of-phase electromotive force.

4. In a system of electrical transmission and distribution, the combination of a source of single-phase alternating currents, a circuit or circuits extending therefrom, means located at a point or points by which out-of-phase electromotive forces or currents are produced from the single-phase current, electrodynamic receivers connected to said single-phase mains, a circuit connected to the producer of out-of-phase electromotive forces or currents extending between the various receivers, switches for connecting each receiver with the single-phase mains, other switches for connecting each receiver with the source of out-of-phase electromotive force only when all the other receivers are disconnected from the source of out-of-phase electromotive force, and an indicating device which is caused to give a signal when the receiver at any point is connected in the circuit carrying the out-of-phase current or electromotive forces.

5. In a system of electrical transmission and distribution, the combination of a source of single-phase alternating currents, a circuit or circuits extending therefrom, means located at a point or points by which out-of-phase electromotive forces or currents are produced from the single-phase current, electrodynamic motors connected to said single-phase mains, a circuit connected to the producer of out-of-phase electromotive forces or currents extending between the various motors, a switch for each motor for connecting it to the single-phase mains, a switch for each motor which operates to connect its motor with the source of out-of-phase electromotive force only when all of the preceding switches are so positioned that the corresponding motors are disconnected from both the source of out-of-phase electromotive force and the circuit connected to said source and means near each electrodynamic motor operated by the motor being connected to the out-of-phase circuit so as to give a signal at its own point and at all preceding points of the out-of-phase circuit where motors are located.

6. In a system of electrical transmission and distribution, the combination of a source of single-phase alternating currents, a circuit or circuits extending therefrom, means located at a point or points by which out-of-phase electromotive forces or currents are produced from the single-phase current, electrodynamic motors connected to said single-phase mains, a circuit connected to the producer of out-of-phase electromotive forces or currents extending between the various motors, a switch for each motor for connecting it to the single-phase mains, a switch for each motor by which it can be connected with the out-of-phase circuit when all the other motors are disconnected from the source of out-of-phase electromotive force, a magnet in the out-of-phase circuit for each electrodynamic receiver operated by the motor being connected to the source of out-of-phase electromotive force so as to give a signal at its own point and at all preceding points of the out-of-phase circuit, where motors are located.

7. In a system of electrical transmission and distribution, the combination of a source of single-phase alternating currents, a line circuit, or circuits, extending therefrom, means located at a point, or points, by which out-of-phase electromotive forces, or currents, are produced from the single-phase current, electrodynamic receivers connected to the single-phase mains and capable of being connected with the conductor leading from the producer of out-of-phase electromotive force or currents, a magnet for each receiver located in series with the out-of-phase conductor, said magnet having an armature which controls a signaling device, and switching devices one for each receiver normally included in and forming part of the conductor leading from the producer of out-of-phase electromotive force and so arranged that on manipulating any of the said switching devices the circuit of the said out-of-phase conductor will be broken, and the corresponding receiver will be connected to the producer of out-of-phase electromotive force.

8. In a system of electrical transmission and distribution, the combination of a source of single-phase alternating currents, a line circuit, or circuits, extending therefrom, means located at a point, or points, by which out-of-phase electromotive forces, or currents, are produced from the single-phase current, electrodynamic receivers connected to the single-phase mains and capable of being connected with the conductor leading from the producer of out-of-phase electromotive force or currents, switching devices one for each receiver normally included in and forming part of the conductor leading from the producer of out-of-phase electromotive force and so arranged that on manipulating one of the said switching devices the circuit of the said out-of-phase conductor will be broken, and the corresponding receiver will be connected to the producer of out-of-phase electromotive force, a magnet for each receiver located in series with the out-of-phase conductor, a magnet connected between the out-of-phase mains and one of the single-phase mains, whose circuit is controlled by the armature of the first-mentioned magnet, said second magnet having an armature which controls the circuit of a single lamp connected in shunt across the branch from the single-phase mains which lead to the said motor.

In testimony that we claim the foregoing as our invention we have signed our names in presence of two subscribing witnesses.

GALILEO FERRARIS.
RICCARDO ARNO.

Witnesses:
  GIVANI BATOSTA BOOTE. [L. S.]
  ALBENO LOWORRA. [L. S.]